(o Model.)　　　　　　　　　　　2 Sheets—Sheet 1.
W. P. BARCLAY.
SHAPING TOOL.

No. 349,475.　　　　　　　Patented Sept. 21, 1886.

WITNESSES:
M. Swance.
W. J. Kennard

INVENTOR
W. P. Barclay.
&
ATTORNEY (No Model.)  W. P. BARCLAY.  2 Sheets—Sheet 2.

SHAPING TOOL.

No. 349,475.  Patented Sept. 21, 1886.

WITNESSES:
M. Swance
W. J. Kennard

INVENTOR
W. P. Barclay
&
ATTORNEY

UNITED STATES PATENT OFFICE.

WILLIAM PARIS BARCLAY, OF CHICAGO, ILLINOIS.

SHAPING-TOOL.

SPECIFICATION forming part of Letters Patent No. 349,475, dated September 21, 1886.

Application filed January 14, 1886. Serial No. 188,605. (No model.)

*To all whom it may concern:*

Be it known that I, WILLIAM PARIS BARCLAY, a citizen of the United States, residing at Chicago, in the county of Cook and State of Illinois, have invented a new and useful Chilled-Metal Shaping-Tool, of which the following is a specification.

My invention relates to improvements in the construction of shaping or turning tools adapted for use with turning-lathes, planers, boring-mills, or such metal-working-machinery as engages similar tools; and the object of my improvement is to provide a useful cast metal chilled tool for service upon straight or curved surfaces.

Figure 1:
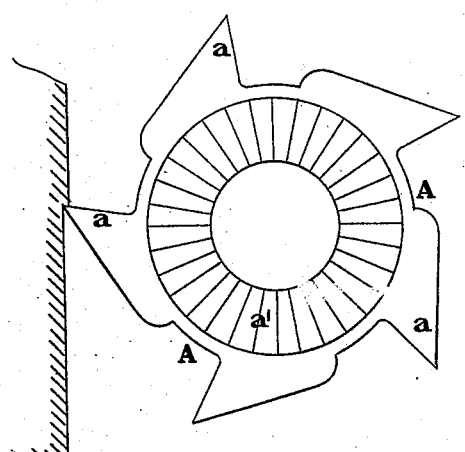
Figure 2:
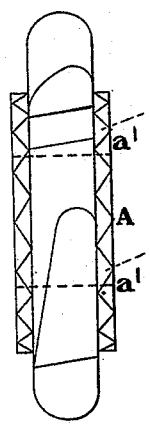
Figure 3:
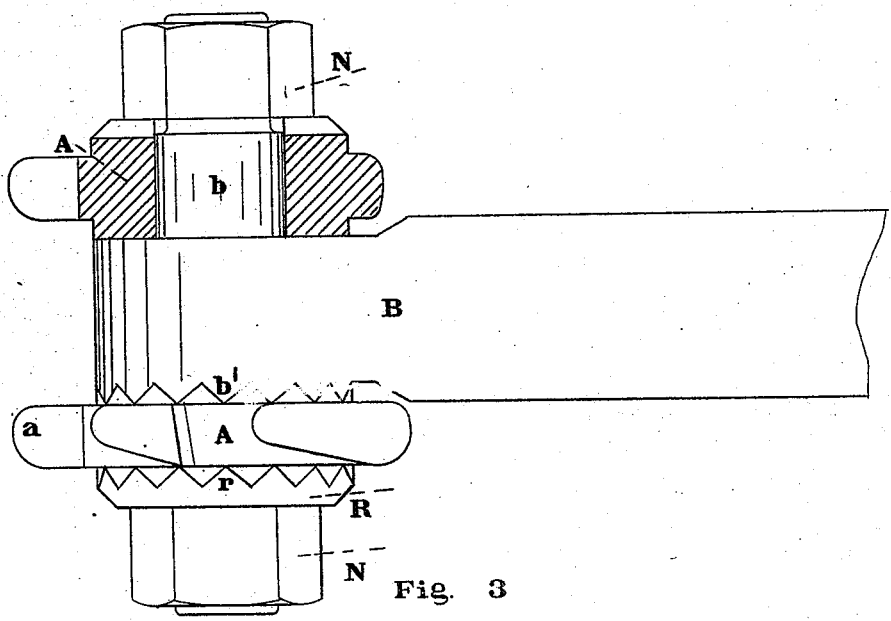
Figure 4:
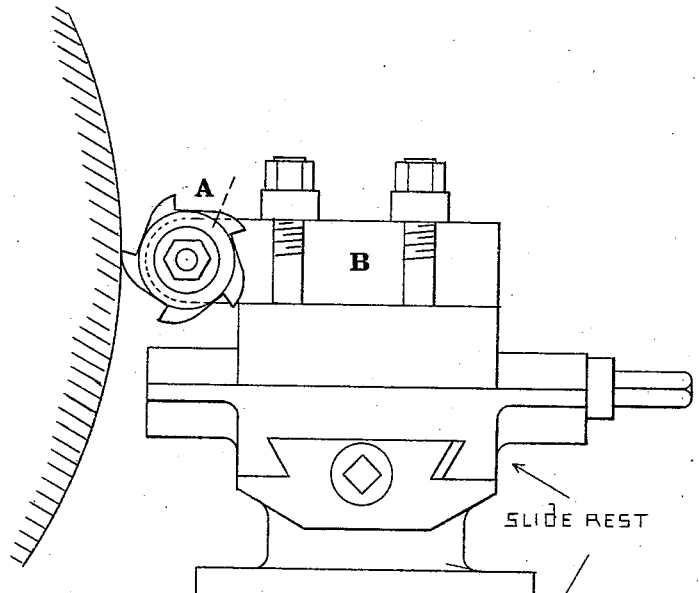
Figure 5:
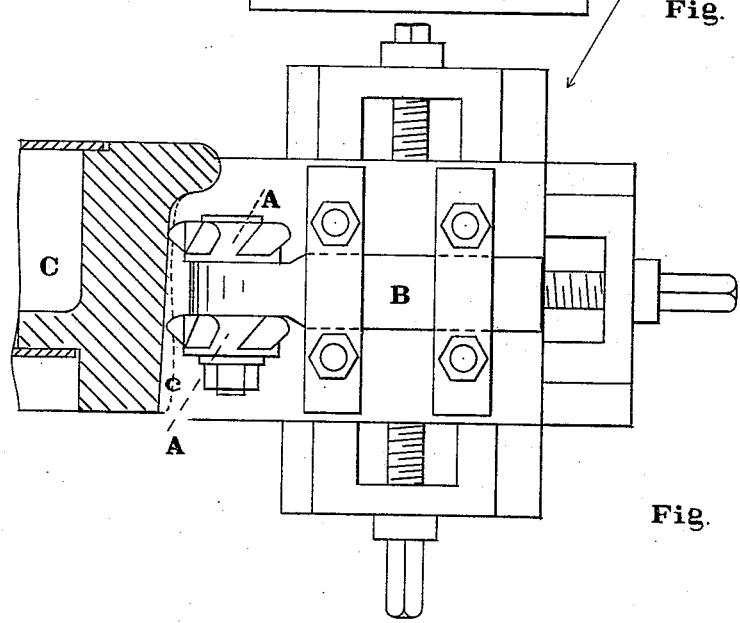

I attain the object by the instrument illustrated in the accompanying drawings, in which Figure 1 is a side elevation of a shaping-tool, said tool being represented in contact with a straight surface. Fig. 2 shows an end elevation of shaping-tool. Fig. 3 is a plan view showing two of said shaping-tools attached to a tool holder or support. Fig. 4 shows a shaping-tool in contact with a curved surface, the tool-holder being attached to an ordinary slide-rest. Fig. 5 shows a plan view of the said slide-rests, and a tool-holder secured to the same having two shaping-tools in contact with the tread of tire of a car-wheel.

Similar letters of reference refer to similar parts.

The shaping-tool A has several projecting tool-edges, *a*, and is formed by casting it in a mold. The tool-edges *a* of similar tools can be made of various forms—such as round edge, square edge, diamond-pointed edge, or such other shapes as may be desired.

Each individual shaping-tool is intended to have the tool-edges *a* of each tool exactly similar. This, however, can be optional. Different forms of the tool-edges *a* may be made upon the same individual shaping-tool.

The shaping-tool A (shown in Figs. 1, 2, and 3) has radial teeth *a'* formed upon each side of the hub of said shaping-tool, and similar teeth, *b'*, are formed upon its tool-holder B. The said shaping-tool is secured to its tool-holder by the bolt *b* and nut N. The radial teeth *a'* of the said shaping-tool take into the radial grooves formed in its tool-holder and are a means of preventing the shaping-tool from turning around upon its holder when a great force acts upon one of the tool-edges *a* of said tool; or several of the tool-edges *a* can be engaged at the same time, as would occur when such tool was used in boring the hubs of wheels or pulleys.

The shaping-tool shown in Figs. 4 and 5 is similar to the shaping-tool shown in Figs. 1, 2, and 3, with the exception that the radial teeth referred to are dispensed with, frictional resistance being sufficient to prevent the shaping-tool from changing its position to its holder B when it is firmly clamped to its holder by a bolt passing through the center of the shaping-tool and the eye of the shaping-tool holder.

The shaping tool or tools shown in Figs. 4 and 5 are attached to a holder that is secured to a slide-rest, and the said shaping-tools are represented in contact with the curved surface of a car-wheel, the dotted line *c* in Fig. 5 indicating the contour of tread of a worn car-wheel.

The shaping-tools are made with circular hubs in preference to any other shape, as the lines of crystallization of the metal composing the said shaping-tools after being cast become more nearly parallel than would be the case were the hubs of such tools cast to a square or triangular form; consequently the circular form of hub is best adapted for strength.

The shaping-tools are made from cast-iron or cast steel, and when a tool-edge *a* breaks away or becomes blunt the shaping-tool is merely turned around on its holder and the next tool-edge engaged upon the work that is being operated upon and shaped to a precise form.

Having described my invention and the method of constructing and operating the same, I claim the following:

A chilled cast-metal shaping-tool, A, with a series of projecting tool-edges, *a*, substantially as shown and described.

WILLIAM PARIS BARCLAY.

Witnesses:
 MORRIS DUNN,
 A. FURNESS.